US006741270B1

United States Patent
Rzepkowski et al.

(10) Patent No.: US 6,741,270 B1
(45) Date of Patent: May 25, 2004

(54) SYSTEMS AND METHODS SCALING A CAPTURED IMAGE USING PREDETERMINED SCALE INFORMATION

(75) Inventors: Kristinn R. Rzepkowski, Rochester, NY (US); Rudolph A. Rodrigues, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,273

(22) Filed: Jan. 19, 2000

(51) Int. Cl.[7] ............................. G06F 3/00; G06F 3/14
(52) U.S. Cl. ..................... 345/810; 345/660; 345/667; 345/764; 345/835; 358/401; 358/448
(58) Field of Search ............................. 345/660, 661, 345/665, 667, 668, 764, 810, 835, 840, 841, 843, 846; 358/401, 442, 443, 448, 449, 451, 468; 715/517, 521, 526

(56) References Cited

U.S. PATENT DOCUMENTS

| | | | | |
|---|---|---|---|---|
| 4,837,635 A | * | 6/1989 | Santos .......................... | 358/401 |
| 5,053,885 A | * | 10/1991 | Telle ............................ | 358/449 |
| 5,212,568 A | * | 5/1993 | Graves et al. ............ | 358/449 X |
| 5,301,036 A | * | 4/1994 | Barrett et al. ............... | 358/448 |
| 5,502,577 A | * | 3/1996 | Mackinlay et al. ......... | 358/468 |
| 5,963,216 A | * | 10/1999 | Chiarabini et al. ......... | 345/660 |
| 6,215,487 B1 | * | 4/2001 | Barrett et al. ............... | 345/840 |

OTHER PUBLICATIONS

"User's Guide—HP DeskScan II Microsoft Windows Version", Sep. 1997, Hewlett–Packard Company, p. 4–71.*
"Professional Desktop Scanner User's Manual" (Mac version), 1999, MacIntosh, pp. 20–21.*
Bill Camarda et al, "Using MICROSOFT Word 97", 1997, QUE Corporation, p. 98–99, 107, 348–351.*

* cited by examiner

Primary Examiner—John Cabeca
Assistant Examiner—X. L. Bautista
(74) Attorney, Agent, or Firm—Oliff & Berridge, PLC

(57) ABSTRACT

Conventionally, text boxes are used to inform an image capture device of the size of an area to which a captured image will need to be scaled, when fitting the captured image into that area of the composite document. In contrast, size selection systems, methods and graphical user interfaces allow the user to select one of a number of predetermined sets of scale dimensions that the captured image is to be scaled to. The size selection systems, methods and graphical user interfaces provide an alternative method for specifying the dimensions that a captured image is to be scaled to. In various exemplary embodiments of the size selection systems, methods and graphical user interfaces, an image size tab of a graphical user interface for an image capture driver includes a scale portion. The scale portion, in addition to having a number of dimension boxes that allow the user to directly input the desired dimensions to which the captured image is to be scaled, also includes a dimension list box. The dimension list box includes predetermined sets of dimensions to which the captured image can be scaled. In various exemplary embodiments, the dimensions list box includes, as the predetermined sets, sets of dimensions for common paper sizes and sets of dimensions for different paper orientations. The predetermined sets of dimensions can also include sets of user-defined dimensions. These user-defined dimensions allow the user to specify the dimensions of an image area of a document that is often used.

9 Claims, 14 Drawing Sheets

SYSTEMS AND METHODS SCALING A CAPTURED IMAGE USING PREDETERMINED SCALE INFORMATION

BACKGROUND OF THE INVENTION

1. Field of Invention

This invention is directed to a graphical user interface for an image capture device, such as a scanner.

2. Description of Related Art

Scanners and other types of image capture devices have become ubiquitous office productivity tools for generating electronic images of physical original documents. Once an electronic image of a physical original document has been generated, the electronic image data can be used in an infinite variety of ways to increase the productivity and the product quality of an office. Such image capture devices include desktop scanners, other stand-alone scanners, digital still cameras, digital video cameras, the scanning input portions of digital copiers, facsimile machines and other multi-function devices that are capable of generating electronic image data from an original document, and the like. These image capture devices can also include image databases that store previously captured electronic image data.

However, as the cost of scanners and other image capture devices has dropped and the output quality of the captured electronic image data has improved, scanners and other image capture devices have been provided with an ever-increasing number of controllable features. Similarly, as users have become comfortable with capturing and using electronic image data obtained from original documents, the uses to which the electronic image data has been put, and thus the needed control over the quality and appearance of the electronic image data, have expanded greatly.

In response, standard interfaces between such image capture devices, including those indicated above, and the various application programs that use such captured electronic image data have been developed. These standard interfaces allow standard-compliant image capture devices and standard-compliant applications to easily communicate. One exemplary embodiment of such a standard interface is the TWAIN™ interface. The TWAIN™ interface allows any TWAIN™-compliant application program to input and use electronic image data using any TWAIN™-compliant image capture device.

SUMMARY OF THE INVENTION

The TWAIN™-compliant component protocol facilitates communication between application programs and image capture devices, such as those indicated above. One such TWAIN™ image capture device is the XEROX® DigiPath™ scanner.

The ever-increasing numbers of features provided by image capturing devices such as the Xerox® DigiPath™ scanner cause users of these image capturing devices to find it increasingly difficult to obtain the desired scanning results. In addition, image capture jobs are becoming longer and more complex.

For example, many images are captured and scaled so that the captured image can be added into an existing electronic document or combined with other electronic document portions to form a composite image. In many cases, the portion of the resulting electronic document that the captured image will be inserted into has a fixed set of dimensions. In this case, the user is required to manually enter the dimension data into one or more text boxes of a graphical user interface in order to inform the image capture device of the ultimate area that the captured image will need to be scaled to fit into.

In conventional image capture device graphical user interfaces, the only way to inform the image capture device of the size of a region to which the captured image will need to be scaled, in order to fit the captured image into that fixed-area region of the composite document, is via text boxes. However, when a large number of images need to be scanned and scaled, having to continually type into the text boxes the appropriate dimensions for each of the captured images to be scaled significantly reduces the user-friendliness of the graphical user interface and the productivity of the user.

This invention thus provides systems, methods and graphical user-interfaces that allow the user to select one of a number of predetermined sets of scale dimensions to which the captured image is to be scaled.

This invention separately provides systems, methods and graphical user interfaces that provide an alternative method for specifying the dimensions to which a captured image is to be scaled.

In various exemplary embodiments of the systems, methods and graphical user interfaces of this invention, an image size tab of a graphical user interface for an image capture driver includes a scale portion. The scale portion, in addition to having a number of dimension boxes that allow the user to directly input the desired dimensions that the captured image is to be scaled to, also includes a dimension list box. The dimension list box includes a plurality of predetermined sets of dimensions to which the captured image can be scaled.

In various exemplary embodiments, the dimensions list box includes, as the predetermined sets, one or more sets of dimensions for common paper sizes and one or more sets of dimensions for different paper orientations. The one or more predetermined sets of dimensions can also include one or more sets of user-defined dimensions. These user-defined dimensions allow the user to specify the dimensions of an image area of a document that is often used. For example, if the user is preparing a school yearbook having a defined set of dimensions to which student photographs are to be scaled, as well as other commonly-used sets of dimensions to which other types of photographs are to be scaled, each of these commonly-used sets of dimensions can be predefined. Thus, the user does not have to continually re-enter the dimensions for these areas by hand into the dimension boxes of the scale portion of the graphical user interface.

These and other features and advantages of this invention are described in or are apparent from the following detailed description of various embodiments of the systems, methods and graphical user interfaces according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
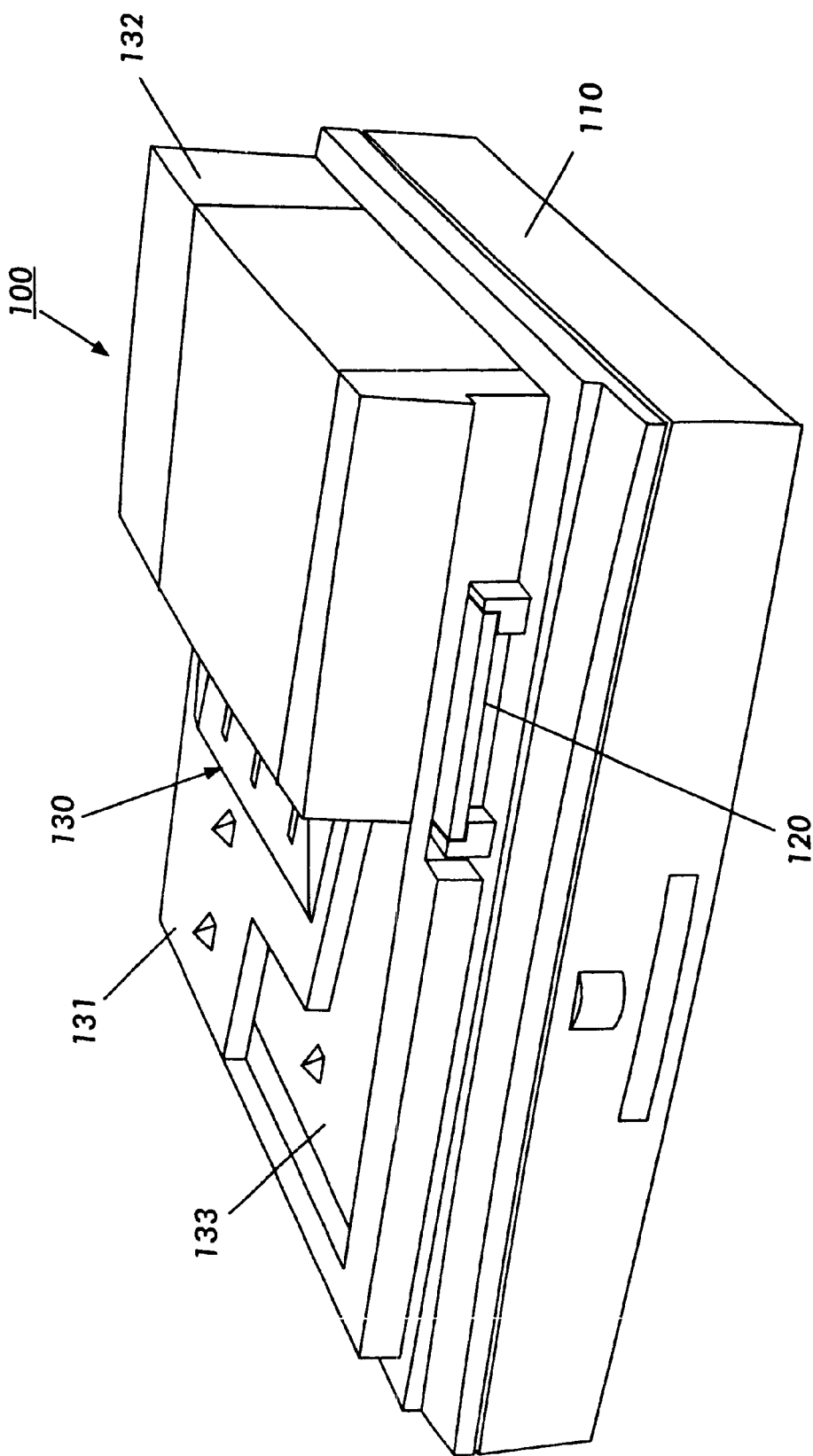
FIG. 1 is a perspective drawing of an exemplary electronic image generating device.

FIG. 1 illustrates a first exemplary embodiment of an electronic image data capturing device 100 usable with the image previewing systems, methods and graphical user interfaces of this invention. As shown in FIG. 1, the electronic image data capture device 100 includes a control panel 110, a document platen 120 on which an original document can be placed to generate corresponding electronic image data and a document handler 130. In particular, the document handler 130 includes a feed tray 131 on which the original document can be placed and a document feeder 132 which moves each document in turn from the feed tray 131 and feeds the removed document to the document platen 120. Each document is then returned to an output tray 133 after electronic image data is generated from that original document.

It should be appreciated that the electronic image data capture device can also be referred to as variously, a scanner, an image capture device, an electronic image data generating device, or the like, and, regardless of the name, can be any one of a stand-alone scanner, a digital copier, a facsimile machine, a multi-function device, a digital still camera, a digital video camera, an electronic image database storing previously generated electronic image data, or any other known or later device that is capable of generating (or supplying) electronic image data from an original document.

Figure 2:
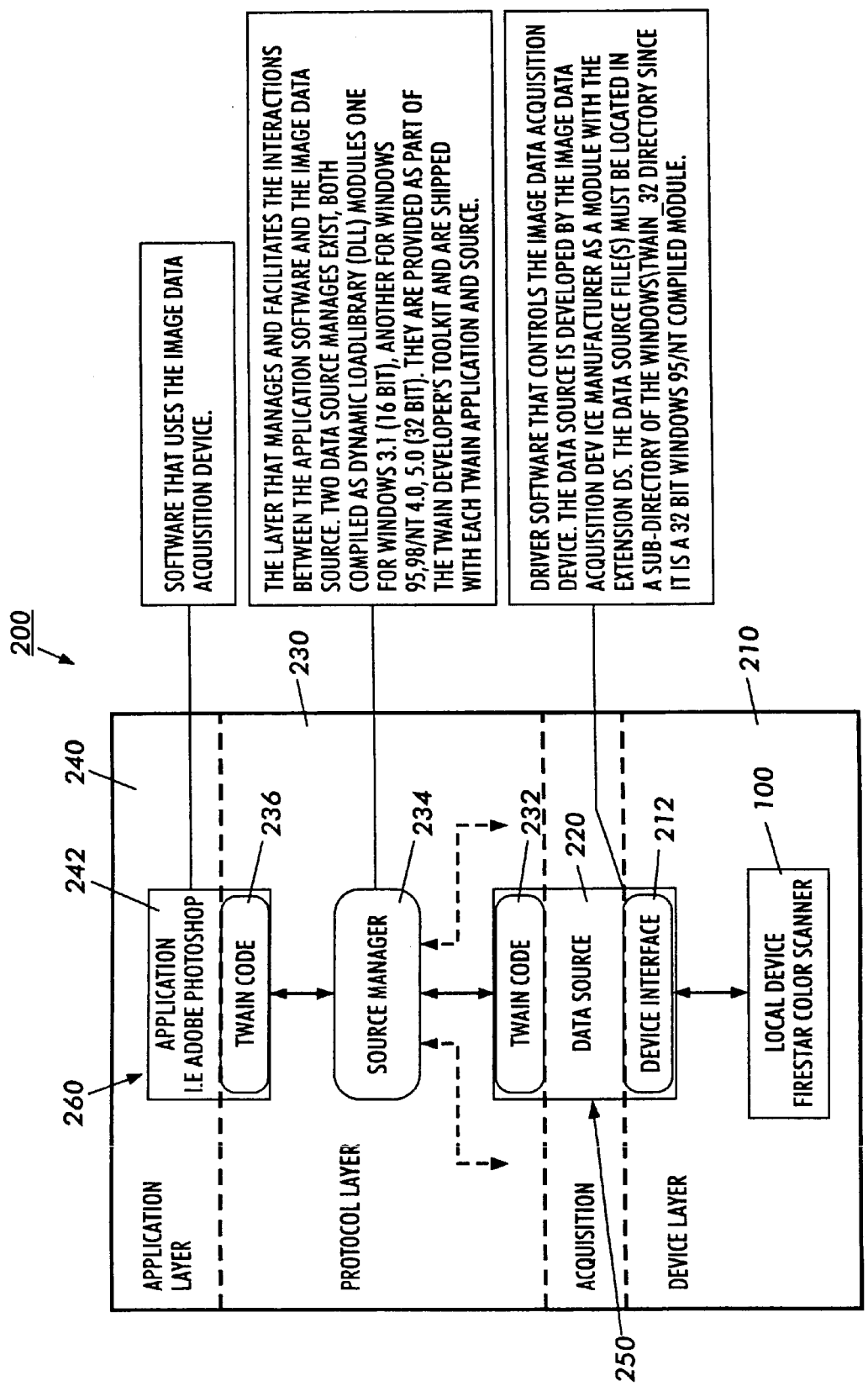
FIG. 2 is a block diagram illustrating a first exemplary embodiment of the structure of an image capture device control system that incorporates the various exemplary embodiments of the image previewing systems, methods and graphical user interfaces of this invention.

FIG. 2 is a block diagram illustrating a first exemplary embodiment of the structural organization of an image capture device control system 200 that incorporates the image previewing systems, methods and graphical user interfaces according to this invention. As shown in FIG. 2, the image capture device control system 200 includes a device layer 210, an acquisition layer 220, a protocol layer 230, and an application layer 240. In particular, the device layer 210 includes the image capture device 100, such as a Xerox® DigiPath™ color scanner or any of the other electronic image data capture devices indicated above. The device layer 210 also includes a device interface portion 212 of a TWAIN™ driver, or TWAIN™ data source, 250. In particular, as shown in FIG. 2, the TWAIN™ driver (or data source) 250 bridges the device layer 210, the acquisition layer 220 and the protocol layer 230.

The protocol layer 230 includes a TWAIN™ code portion 232 of the TWAIN™ driver (or data source) 250, a source manager 234 and a TWAIN™ code portion 236 of a TWAIN™-compliant application 260. The application layer 240 includes the application portion 242 of the application 260.

As shown in FIG. 2, control and data signals are provided from the electronic image data capture device 100 to the TWAIN™ driver (or data source) 250 through the device interface portion 212 of the TWAIN™ driver (or data source) 250. Similarly, control and data signals between the TWAIN™ driver (or data source) 250 and the source manager through the TWAIN™ code portion 232 of the TWAIN™ driver (or data source) 250. The control and/or data signals are also provided between the source manager 234 and the application 260 through the TWAIN™ code portion 236. In various exemplary embodiments, the TWAIN™ driver (or data source) 250 controls the electronic image data capture device 100. In various ones of these exemplary embodiments, the TWAIN™ driver or data source 250 is developed by the manufacturer of the electronic image data capture device 100.

The source manager 234 manages and facilitates the interactions between the application 260 and the TWAIN™ driver or data source 250. In various exemplary embodiments, one or more of two distinct source managers 234 have been implemented. Both are compiled as dynamic loading library modules. One exemplary dynamic load library implementation of the source manager 234 is a 16-bit program developed for, for example, Microsoft® Windows® 3.1. The other dynamic load library implementation of the source manager 234 is a 32-bit program developed for Windows® 95/98 and Windows® NT 4.0/5.0. In general, these two dynamic load library modules are provided as part of the TWAIN™ developers tool kit and are shipped with each TWAIN™-compliant application and at each TWAIN™-compliant electronic image data generating device.

Figure 3:
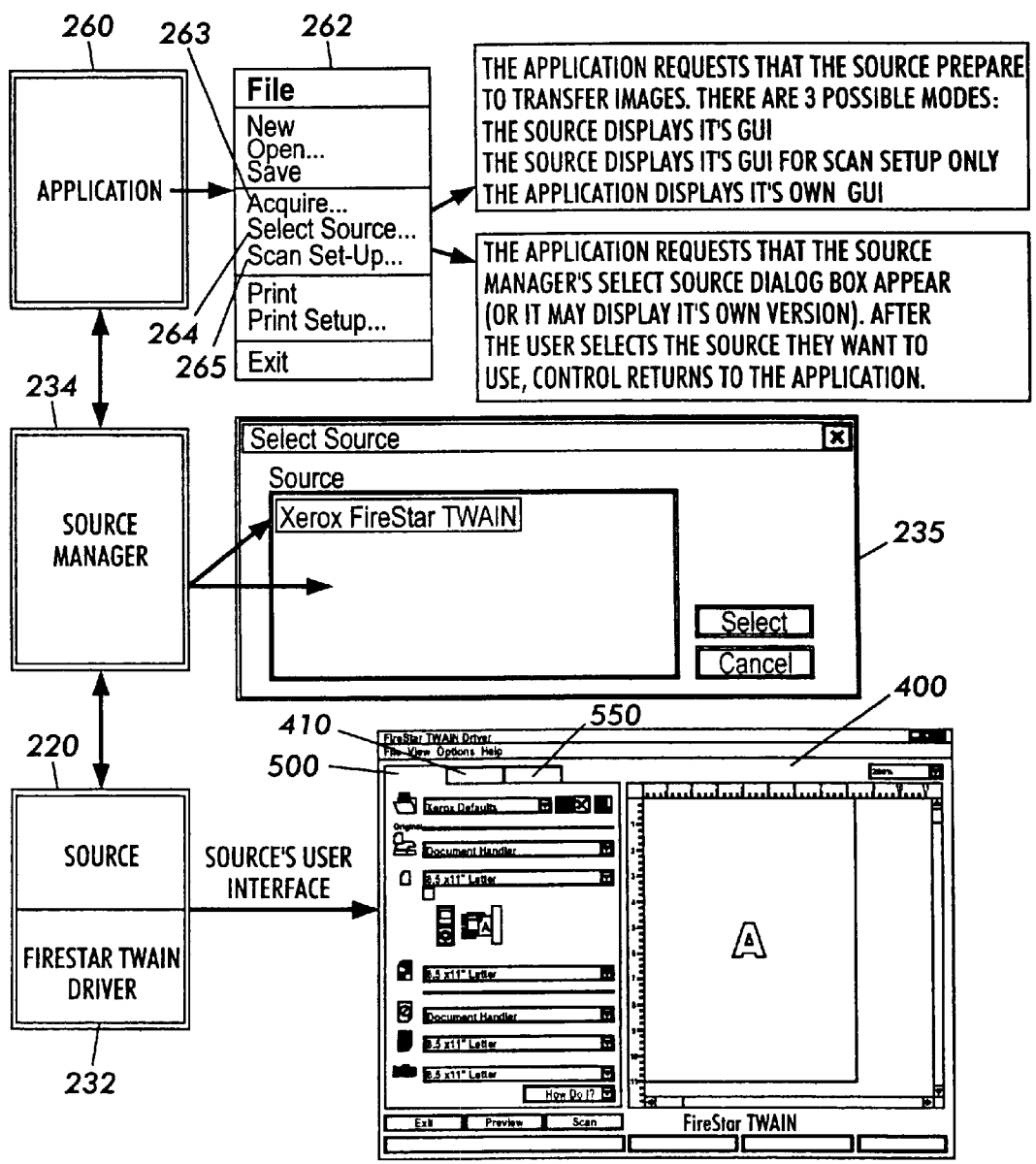
FIG. 3 is a second exemplary embodiment of an image capturing and using system that incorporates the systems and methods of this invention.

FIG. 3 illustrates one exemplary embodiment for accessing the systems, methods and graphical user interfaces according to this invention. As shown in FIG. 3, a FILE menu 262 of a TWAIN™ compliant application 260 will include a plurality of menu items that provide an interface to a TWAIN™ compliant electronic image data capture device 100, such as a TWAIN™-compliant scanner. These menu items include various ones of at least an Acquire menu item 263, a Select Source menu item 264 or a Scan Set-Up menu item 265.

As shown in FIG. 3, selecting the Acquire menu item 263 causes the application 260 to request that the electronic image data capture device 100 prepare to capture electronic image data from an original document and/or transfer capture electronic image data to the image capture device control system. In particular, in response to the selecting the Acquire menu item 263, the application 260 can display its own graphical user interface. Alternatively, the TWAIN™ driver (or data source) 250 for the selected electronic image data capture device can display one of its graphical user interfaces. Finally, if the Scan Set up menu item 265 was selected, the TWAIN™ driver (or data source) 250 can display a specific Scanner Set-Up graphical user interface.

In particular, as shown in FIG. 3, when any of the menu items 263–265 are selected, the application 260 calls the source manager 234. In response, the source manager accesses each TWAIN™ driver (or data source) 250 that is present in the image capture device control system 200. The source manager 234 then displays, in a graphical user interface 235, all of the different TWAIN™ drivers (or data sources) 250 present on the image capture device control system 200. Once the user selects the particular TWAIN™ driver (or data source) 250 that the user wishes to use, the TWAIN™ driver (or data source) 250 will display a graphical user interface 400 that allows the user to select various ones of the image capture parameters and scanning control functions implemented in that TWAIN™ driver (or data source) 250.

Figure 4:
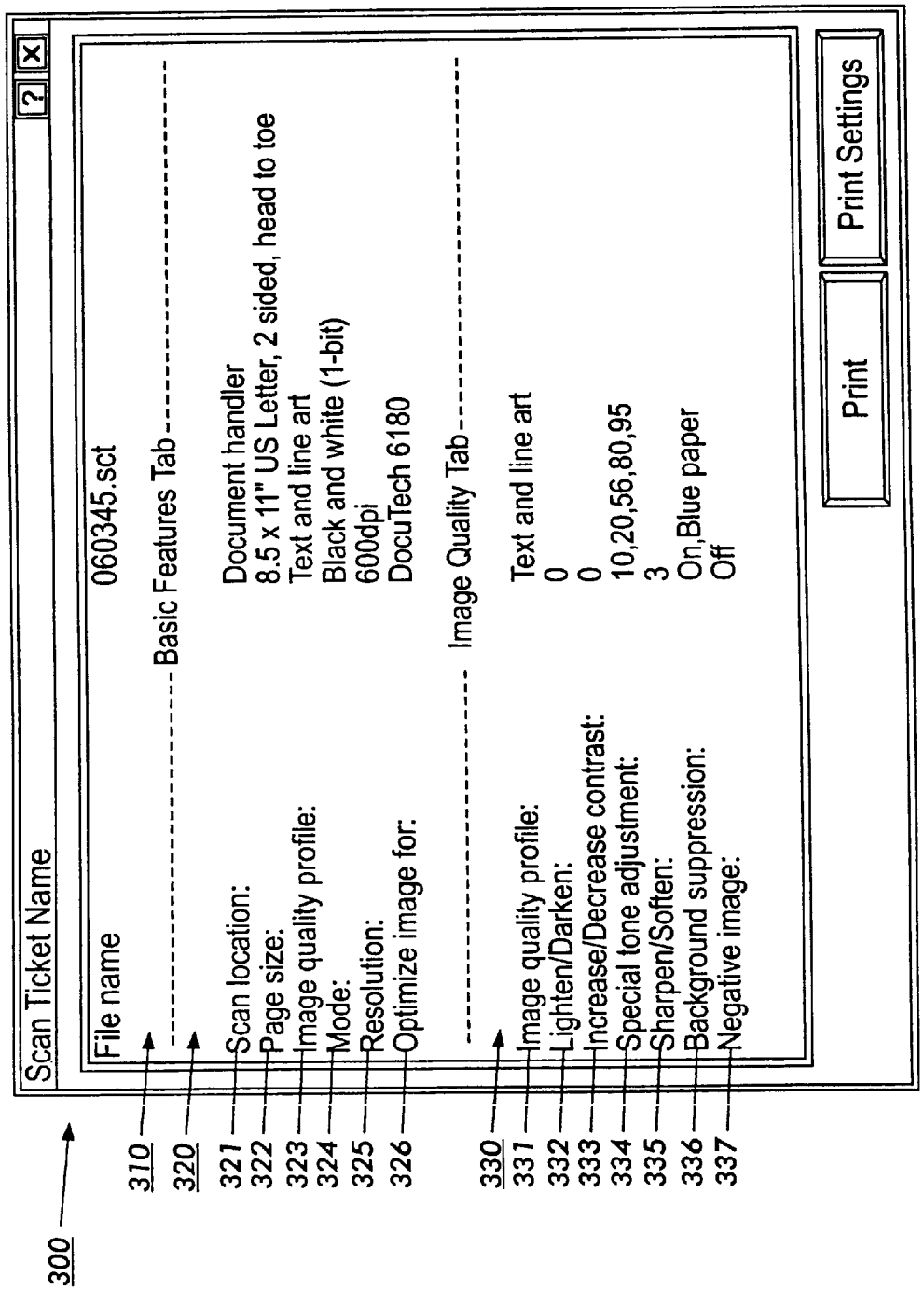
FIG. 4 is an exemplary embodiment of a scan ticket illustrating various image scanning parameters according to this invention.

FIG. 4 illustrates one exemplary embodiment of a scan ticket 300. Scan tickets contain all of the settings in the TWAIN™ graphical user interface 400, which is discussed in greater detail below. In general, there will be a set of one or more sets of saved scan parameters, or "scan tickets" for each language supported the TWAIN™ driver (or data source) 250 according to this invention. When the TWAIN™ graphical user interface 400 is displayed, only those sets of saved scan parameters, or "scan tickets" for the language the user is currently operating in are displayed. When a set of saved scan parameters, i.e., a "scan ticket", is selected, all the settings contained within that scan ticket are used to populate the TWAIN™ graphical user interface 400 according to this invention.

As shown in FIG. 4, a scan ticket 300 includes at least a file name portion 310, a basic features portion 320, an image quality portion 330 and an image size portion (not shown). The basic features portion 320 corresponds to the basic features tab 500 of the TWAIN™ graphical user interface 400 shown in FIG. 3. Similarly, the image quality portion 330 and the image size portion correspond to the image quality tab 410 and the image size tab 550, respectively, of the graphical user interface 400 shown in FIG. 3. The image quality tab 410 is described in greater detail in U.S. patent application Ser. No. 09/487,271, filed Jan. 19, 2000, and incorporated herein by reference in its entirety.

As shown in FIG. 4, the basic features portion 320 includes a scan location parameter 321, an input original document size parameter 322, an original image quality profile parameter 323, a mode parameter 324, a resolution parameter 325, and image optimization parameter 326. The image quality portion 330 includes an image quality profile parameter 331, a brightness parameter 332, an increase/decrease parameter 333, a special tone adjustments parameter 334, a sharpen/soften parameter 335, a background suppression parameter 336 and a negative image parameter 337.

In particular, the scan location parameter 321 indicates the particular electronic image capture device that is to be used to capture electronic image data from a particular original document. The page size parameter portion 322 indicates the size of the input document, whether the input document is single-sided or double-sided, and, if the original document is double-sided, how the two images on each side of the original document are oriented relative to each other. The image quality profile portion 323 indicates image characteristics of and enhancements to be applied to the original document when it is made into its electronic form. Image quality profiles are described in greater detail in U.S. patent application Ser. No. 09/487,269, filed Jan. 19, 2000, and incorporated herein by reference in its entirety. The mode portion 324 indicates the particular image capture mode to be used. For example, the image of the original document could be captured as a binary bitmap image, as shown in FIG. 4 or, as an 8-bit grayscale image, or as a color image having various color spaces and bit depths.

The resolution portion 325 indicates the resolution of the generated electronic image data. The image optimization portion 326 indicates a particular output device, such as a particular laser printer, a particular ink jet printer, a particular digital copier, or the like, that will be used to generate hard copies of the generated electronic image data and thus for which the electronic image data should be optimized for when the electronic image data of the original document is captured.

The image quality profile parameter 331 of the image quality portion 330 is the same as the image quality profile parameter 323. The lighten/darken parameter 332 indicates whether the electronic image data is to be lighter or darker than the images on the original document. Similarly, the increase/decrease contrast parameter portion 333 indicates whether the contrast of the electronic image data is to be greater or less than the contrast of the images on the original document. The special tone adjustment parameter portion 334 is used to provide finer control over the tone reproduction curve that is used to convert the continuous tone image values of the original document to the multi-bit-depth image values of the generated electronic image data. This is described in greater detail in the incorporated (Attorney Docket No. 104427) application.

The sharpen/soften parameter portion 335 used to indicate whether the edges within the images in the original document should be sharpened or softened in the generated electronic image data. The background suppression parameter portion 336 is used to indicate whether background suppression should be used, and if so, the color or other quality of the background of the original document that is to be suppressed. The negative image parameter portion 337 indicates whether the generated electronic image data should be a negative image relative to the images on the original document. Various other ones of the particular scanning parameters discussed above are further disclosed in U.S. patent application Ser. Nos. 09/487,274, 09/487,272, and 09/487,266, each filed Jan. 19, 2000 and each incorporated herein by reference in its entirety.

Figure 5:
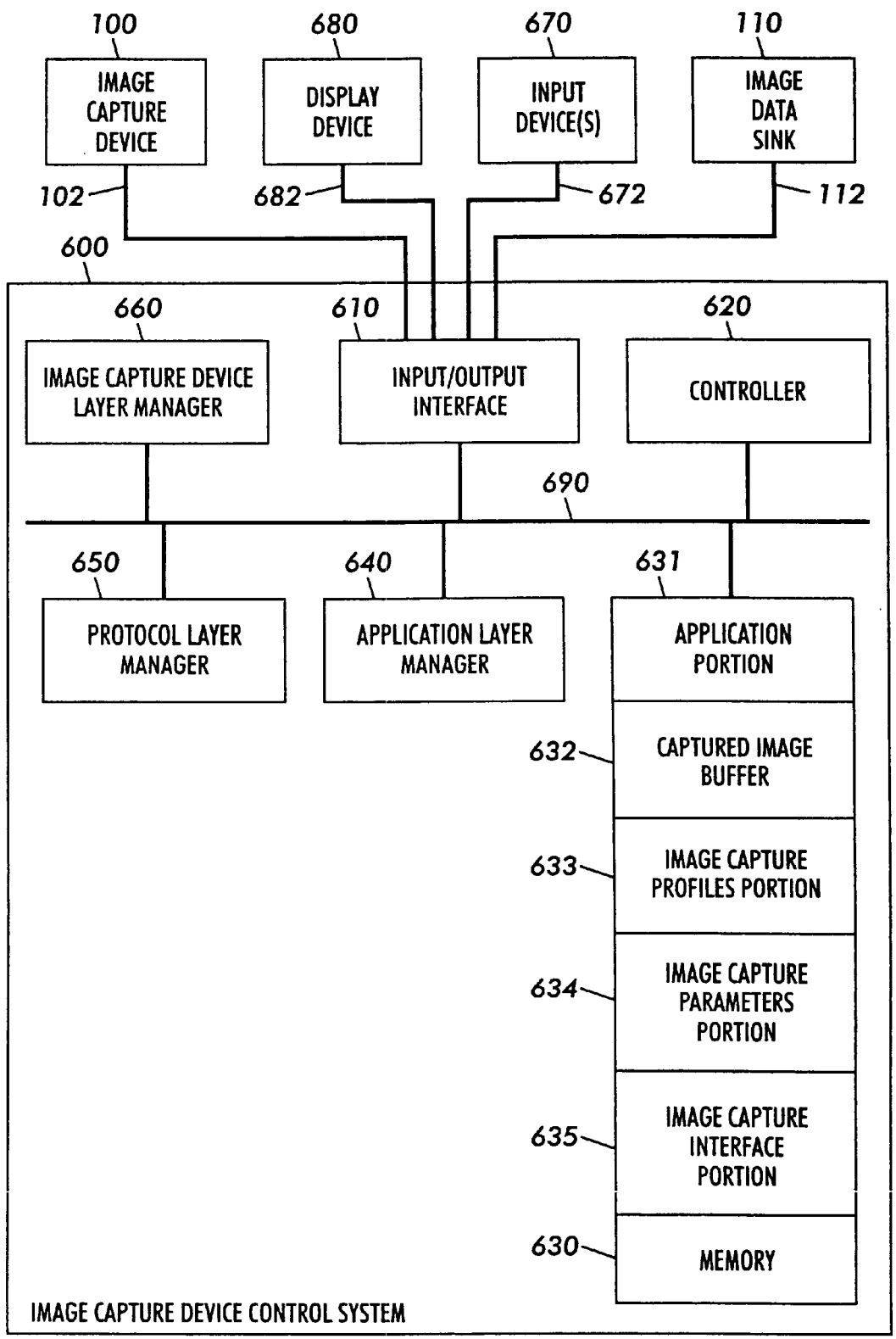
FIG. 5 is a block diagram of a second exemplary embodiment of the image capture control system that incorporates the image previewing systems, methods and graphical user interfaces of this invention.

FIG. 5 is a block diagram illustrating a second exemplary embodiment of the structural organization of an image captured device control system 600 that incorporates the image previewing systems methods and graphical user interfaces according to this invention. As shown in FIG. 5, the image capture device control system 600 includes an input/output interface 610, a controller 620, a memory 630, an application layer manager 640, a protocol layer manager 650, and an image capture device layer manager 600, each interconnected by a data/control bus 690.

The image capture device 100 is connected to the input/output interface 610 using a link 102. Similarly, an image data sink 110 can be connected to the input/output interface 610 using a link 112. The links 102 and 112 can each be any known or later developed device or system for connecting the image capture device 100 and the image data sink 110, respectively, to the image capture device control 600, including a direct cable connection, a connection over a wide area network or a local area network, a connection over an intranet, a connection over an extranet, a connection over the Internet, or a connection over any other distributed processing network or system. In general, the links 102 and 112 can each be any known or later developed connection system or structure usable to respectively connect the image capture device 100 and the image data sink 110 to the image capture device control system 600. It should also be appreciated that the links 102 and 112 can be wired or wireless links that use portions of the public switch telephone network and/or portions of a cellular communication network.

It should also be appreciated that, in general, the image data sink 110 can be any device that is capable of outputting or storing electronic images generated using the image capture device control system 600 using the systems, methods and graphical user interfaces according to this invention, such as a printer, a copier, any other image forming device, a facsimile device, a display device, a storage device, or the like.

While FIG. 5 shows the image capture device 100, the image capture device control system 600 and the image data sink 110 as separate devices, the image capture device control system 600 may be integrated with either or both of the image capture device 100 and/or the image data sink 110, such as, for example, in a digital copier. With such a configuration, for example, the image capture device 100, the image data sink 110 and the image capture device control system 600 may be contained within a single device.

The input device or devices 670 can include any one or more of a mouse, a keyboard, a touch pad, a track ball, a touch screen, or the like, or any other known or later developed device that is capable of inputting data and control signals over the link 672 to the input/output interface 610. Similarly, the display device 680 can be any known or later developed display device, including a cathode ray tube type monitor, a flat screen type monitor, an LCD monitor, or any other known or later developed device on which the graphical user interfaces according to this invention can be displayed and interacted with using one or more of the input devices 670. The display device 680 is provided with control and/or data signals from the input/output interface 610 over the link 682.

Like the signal lines 102 and 112, the links 672 and 682 can be any known or later developed device or system for connecting the input devices 670 and the display device 680, respectively, to the image capture device control system 600, including a direct cable connection, a connection over a wide area network or local area network, a connection over a intranet, a connection over an extranet, a connection over the Internet, a connection over the public switched telephone network, a connection over a cellular network, or a connection over any other distributed processing or communications network or system, including both or either wired and wireless systems. In general, the links 672 and 682 can each be any known or later developed connection system or structure usable to connect the input devices 670 and the display device 680, respectively, to the image capture device control system 600.

The memory 630 includes an application portion 631 in which an application program and any application files used by that application program can be stored. Similarly, the captured image buffer 632 is used to store the captured image data input from the image capture device 110 over the signal line 102 and through the input/output interface 610. In general, the captured electronic image data will be stored in the captured image buffer 632 under control of the controller 620 the image capture device layer manager 660, the protocol layer manager 650 and/or the application layer manager 640.

The image capture profiles portion 633 stores the image capture profiles, as set forth in the incorporated 269 application, as well as job tickets 300, and the like. The image capture parameters portion 634 stores a current set of the image capture parameters to be used by the image capture device 100 when capturing an image. The image capture interface portion 635 stores the various graphical user interfaces shown in FIGS. 3, 4, and 6 and as described above and in detailed below.

The application layer manager 640 manages the application layer 240, and in particular, the application portions 242 of any executing applications 260.

The protocol layer manager 650 manages the protocol layer 230, including the source manager 234. The protocol layer manager 650 communications with the application layer manager 640 using the TWAIN™ application programming interfaces 236 of the executing applications 260.

The image capture device layer manager 660 manages each of the TWAIN™ drivers (or data sources) 250 that may be implemented for different ones of the image capture devices 100 that may be accessible by the image capture device control system 600 over various ones of the links 102. In particular, the image capture device layer manager 660 communicates with the protocol layer manager 650 using the acquisition layer application programming interface 232 of the particular TWAIN™ driver (or data source) 250. Similarly, the image capture device layer manager 660 communicates with the image capture device 100 through the input/output interface 610 and over the link 102 using the device interface portion 212.

The image capture device layer manager 660 causes various ones of the image capture graphical user interfaces, such as the graphical user interface 400 shown in FIG. 3, to be displayed on the display device 680. The user can then change and/or input the various image capture parameters. The various image capture parameters can be input through the various graphical user interfaces that the image capture device layer manager 660 displays on the display device 680. Then, after the user saves the various image capture parameters or initiates the corresponding image capture device, the image capture device layer manager 660 stores the selected image capture parameters in the image capture parameters portion 640. The image capture device layer manager 660 then outputs the selected image capture parameters through the input/output interface 610 and over the link 102 to the image capture device 100. The image capture device 100 then uses the various image capture parameters received from the image capture device control system 600 when capturing electronic image data from an original document and when supplying that capture electronic image data over the link 110 to the image capture device control system 600.

Figure 6:
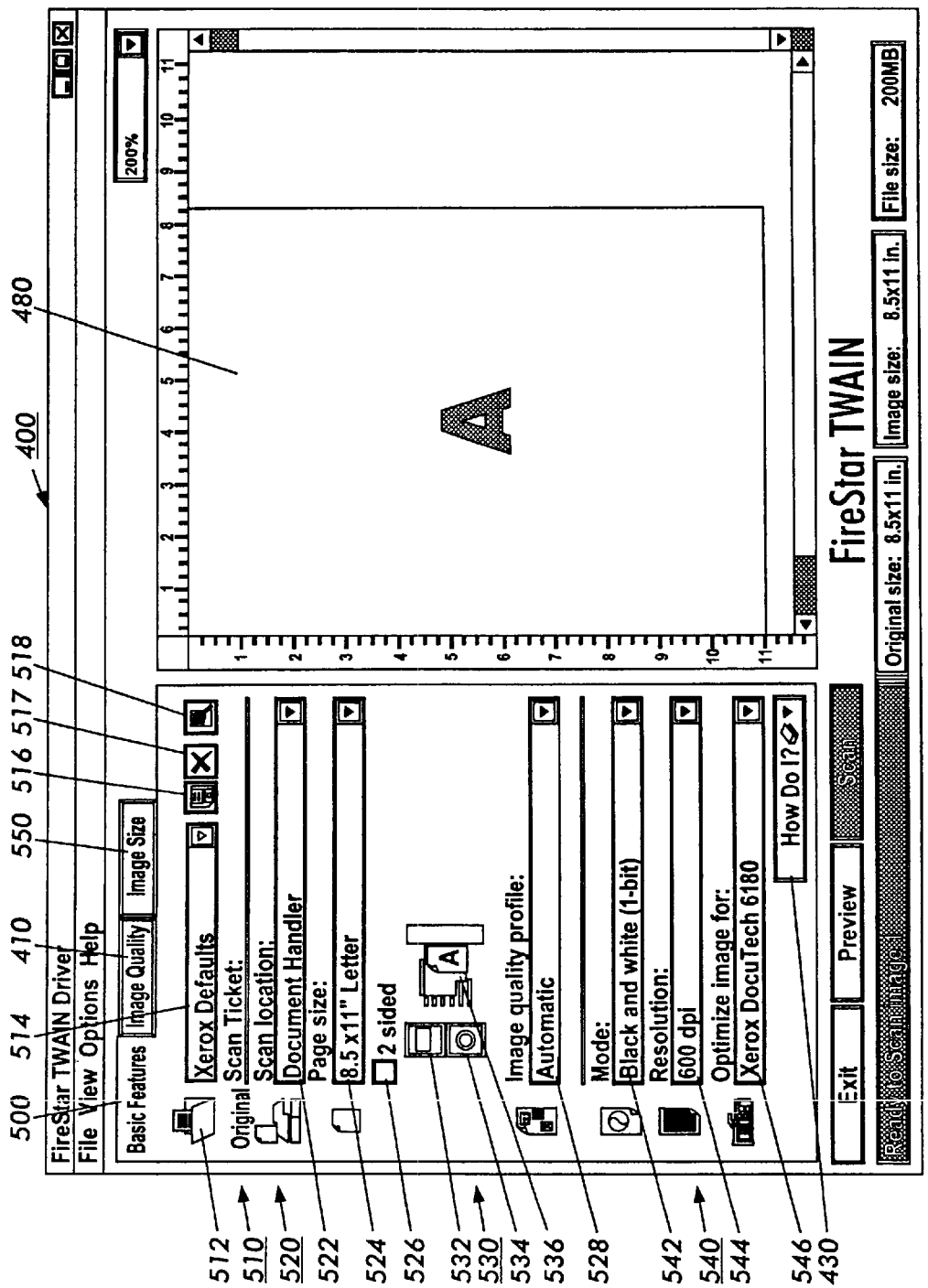
FIG. 6 is a graphical user interface incorporating the scan preview pane portion and visual cues according to this invention.

FIG. 6 shows one exemplary embodiment of the graphical user interface 400. As shown in FIG. 6, the graphical user interface 400 includes the image quality tab 410 and the image size tab 550 in addition to the basic features tab 500. The basic features tab 500 includes a scan ticket portion 510, an original document parameters portion 520, and an image capture parameters portion 540. The basic features tab 500 also includes an instance of a "How Do I" button 430. The "How Do I" button 430 is usable to access an operating instructions help function, which is disclosed in greater detail in the incorporated 266 application.

In particular, the scan ticket portion 510 includes a status icon 512 that indicates the saved status of the scan ticket indicated in a scan ticket selection box 514. The current image capture parameters input into each of the basic features tab 500, the image quality tab 410 and the image size tab 550 can be saved to the scan ticket named in the scan ticket dialogue box 514 by selecting the save scan ticket button 516. In contrast, the named scan ticket displayed in the scan ticket dialogue box 514 can be deleted by selecting the delete scan ticket button 517. The show scan ticket button 518 allows the user to quickly view all of the currently loaded scan settings in a text list. This allows the user to view the information on every setting without having to navigate all of the various dialogues in the various portions of the graphical user interface 400.

The original document parameters portion 520 of the basic features tab 500 includes a scan location list box 522, a page size list box 524, a double-sided check box 526, and an image quality profile list box 528. The original document portion 520 also includes a document orientation portion 530 that allows the user to specify how the document will be oriented on the platen 120 of the image capture device 100. The document orientation portion 530 is described in greater detail in the incorporated 272 application.

In particular, the document orientation portion 530 includes a short edge first/long edge first (SEF/LEF) toggle button 532, a rotate button 534 and an input document mimic portion 536. The SEF/LEF toggle button 532 allows the user to indicate whether the first edge of the original document to be introduced into the document handler 130 of the image capture device 100 is the long edge, i.e., the 11 inch edge of standard 8½×11 inch paper, or the short edge, i.e., 8½ edge of standard 8½×11 inch paper. In particular, the user will be expected to feed the original document into the document handler 130 or place it on the platen 110 in the same orientation as specified in the graphic displayed on the SEF/LEF toggle button.

The rotate button 534 allows the user to specify the orientation of the image on the input document. That is, the user may be providing the original document to the document handler using the long edge first orientation while the image has been placed onto that original document in a landscape orientation. In this case, by activating the rotate button 534, the image orientation of the captured image will be rotated 90° clockwise.

The input document mimic portion 530 is a graphic that assists the operator in putting the document into the scanner correctly to receive the desired output. That is, the input document mimic portion 536 can be used by the user to precisely identify to the image capture device the paper size and feed direction of the original document to be scanned as well as the image orientation, so that the captured images will be returned to the calling application in the desired orientation.

The image quality profile list box 528 allows the user to select an image quality profile. As indicated in the incorporated 269 application, each image quality profile is a collection of all the settings on the image quality tab and the various dialogue boxes and other graphical user interface widgets that are accessed through the image quality tab. In particular, the image quality profile list box 528 will include the same image quality profiles as will be provided on the image quality tab. When an image quality profile is selected using the image quality profile list box 528, the image quality profile parameters displayed in the various portions of the image quality tab will be change accordingly.

The image capture parameters portion 540 of the basic feature tab 500 includes a mode list box 542, a resolution list box 544, and an optimize image list box 546. The mode list box 542 allows the user to select the output mode of the image capture device 100. It should be appreciated that the particular modes displayed when the mode list box 542 is selected will depend on the particular image capture device identified in the scan location list box 522 and the particular modes available with that particular image capture device. The possible modes, include, but are not limited to, 1-bit or black/white captured images, 8-bit or grayscale captured images, or various types of 24-bit captured images, including red/green/blue (RGB) color, standard red/green/blue (sRGB) color and Luminance/Blue Chromaticity/Red Chromaticity (YCbCr) color.

The resolution list box 544 allows the user to select the output resolution of the captured image, in dots per inch (dpi). The optimize image list box 546 allows the user to select the output device for which the various captured image quality parameters on the image quality tab 410 should be set to so that the captured image, when printed on the selected output device, will provide the highest quality output image. In particular, in one exemplary embodiment, when a printer is selected in the optimize image list box 546, the tone reproduction curve (TRC) for the 1-bit (black/white) mode is selected as the tone reproduction curve for the indicated printer.

Figure 7:
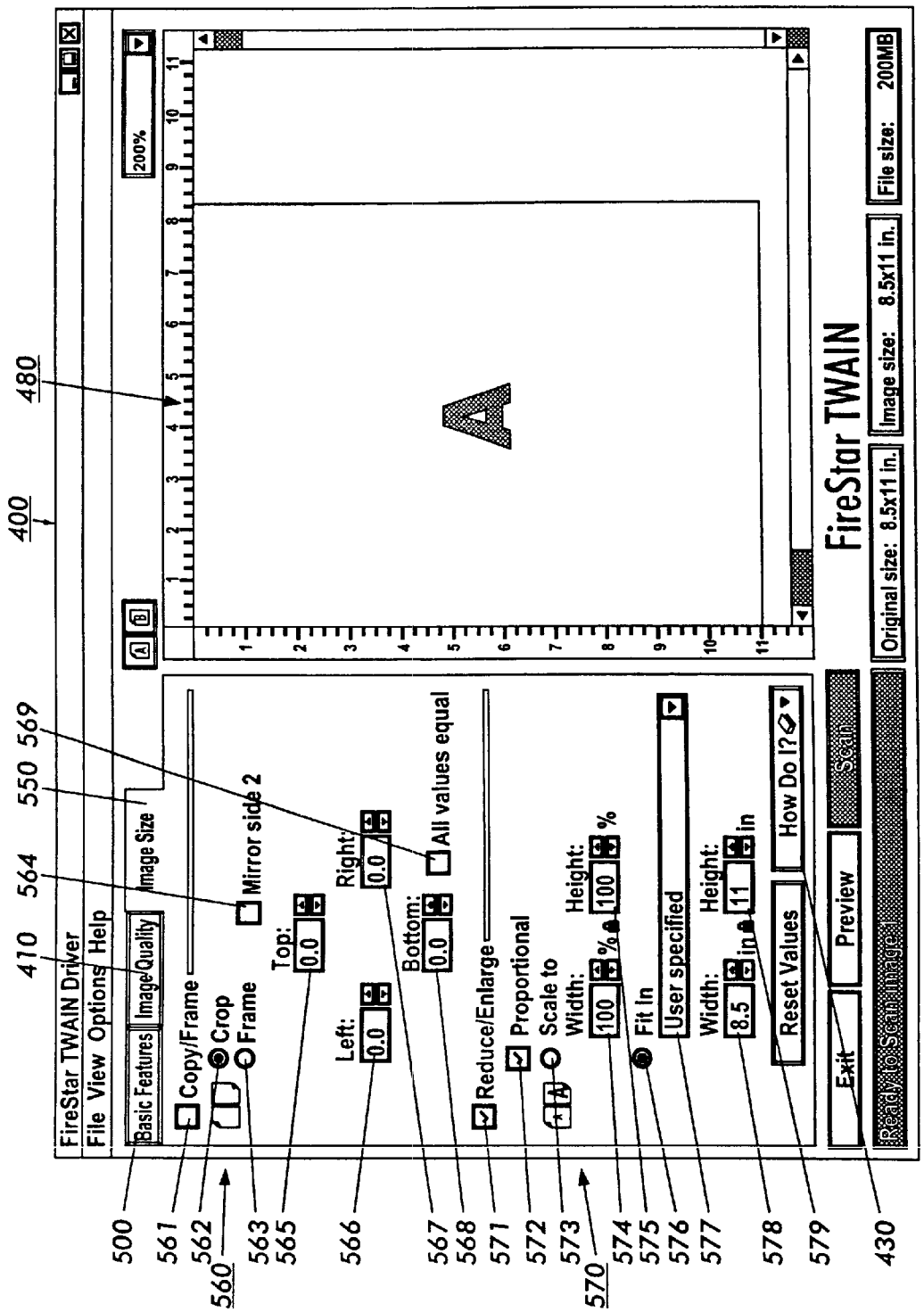
FIG. 7 shows in greater detail one exemplary embodiment of the image size tab of the graphical user interface shown in FIG. 6.

FIG. 7 shows the image size tab 550 in greater detail. As shown in FIG. 7, the image size tab 550 includes a reset values button 551, a crop/frame portion 560 and a reduced/enlarge portion 570. When the reset values button 551 is pressed, the various image capture parameters set forth in the crop/frame portion 560 and the reduce/enlarge portion 570 are reset to the selected default values. Additionally, the image size tab 550 like the basic features tab 500, the image size tab 550 also includes an instance of the "How Do I" button 430.

The crop/frame portion 560 of the image size tab 550 includes a crop/frame checkbox 561, a crop radio button 562, a frame radio button 563, a mirror checkbox 564, and a set of top, left, right, and bottom parameter entry boxes 564–568 that define the location of the rectangle to be cropped out of the capture electronic image data. Finally, the crop/frame portion 560 includes an all values equal checkbox 569.

In particular, the crop/frame checkbox 561 enables or disables all of the crop/frame feature parameters. When checked, the crop/frame checkbox 561 enables all of the crop/frame controls 562–569. Additionally, when checked, the crop/frame checkbox 561 generates a crop/frame marquee selection control 484 in a preview portion 480 of the graphical user interface 400. The crop/frame marquee selection control 484 is discussed in greater detail below. The crop/frame checkbox 561 also allows the user to easily turn on or off the selected crop values on a scan-by-scan basis, without having to reset or clear the values entered into each of the crop/frame control portions 562–569.

The top, left, right and bottom parameter boxes 565–568 allow the user to define a rectangular selection area of the original document that will be cropped or framed. The top, left, right and bottom parameter boxes 565–568 allow the user to specify the distances between the corresponding margin of the original document, based on the size of the original document selected in the page size text box 524, and the corresponding edge of the rectangular selection area. The "all values are equal" check box 569, when checked, locks all four of the parameters 565–568 together.

The crop radio button 562, when selected, indicates that the portions of the scanned electronic image data outside of the rectangular selection area defined by the values in the dimension boxes 565–568 should be deleted. Thus, the captured image, before any scaling, is limited to the size of the area within the defined rectangular selection area. In contrast, when the frame radio button 563 is selected, the area outside of the rectangular selection area is given a default color. In general, this default color will be white. In contrast to the captured image after cropping, the captured image size remains the same as the page size of the original document selected in the page size text box 524 shown in FIG. 6.

The mirror check box 564 is enabled only when the two-sided check box 526 of the basic features tab 550 is checked. When enabled and checked, the mirror check box 564 mirrors the dimensions in the top, left, right and bottom dimension parameter boxes 565–568 onto the second side of the page. In particular, the dimensions will be mirrored depending on how the user has defined the orientation of the second side relative to the first side, i.e., head-to-head or head-to-toe.

The reduce/enlarge portion 570 of the image size tab 550 includes a reduce/enlarge check box 571, a proportional check box 572, and a scale-to radio button 573 and associated height and width scale factor parameter boxes 574 and 575. The reduce/enlarge portion 570 also includes a fit-in radio button 576, an dimension list box 577 and associated height and width dimension boxes 578 and 579.

The reduce/enlarge check box 571, when checked, enables all of the reduce/enlarge control elements 572–579. The proportional check box 572, when checked, links together the height and width scale factor parameter boxes 574 and 575, and the height and width dimension boxes 578 and 579, so that the aspect ratio of the captured image remains constant to the original document. This prevents distortion.

The scale-to radio button 573, when selected, enables the scale factor parameter boxes 574 and 575 to be used to select the desired scaling factors. In contrast, the fit-in radio button 576, when selected, enables the fit-in dimension list box 577, and possibly the dimension parameters boxes 578 and 579, to allow the user to specify the absolute dimensions, rather than the reduction/magnification proportions, to be used to scale the captured image relative to the original image. In particular, the fit-in dimension list box 577 allows the user to quickly select a particular one of a number of sets of predetermined dimensions to be used to scale the captured image.

When the user selects the fit-in radio button 576, the scale factor parameter boxes 574 and 575 are disabled. Accordingly, their appearance is changed to a "grayed-out" appearance and the scale factor parameter boxes 574 and 575 become unselectable. At the same time, the fit-in dimension list box 577, and possibly the dimension parameter boxes 578 and 579, is enabled. Accordingly, the appearance of at least the fit-in dimension list box 577 is changed from a "grayed-out", unselectable, appearance to an active, selectable appearance. The fit-in dimension list box 577, and possibly the dimension parameter boxes 578 and 579, thus becomes selectable.

When the user selects the fit-in radio button 576, the captured image will be fit into either the selected predetermined set of dimensions displayed in the fit-in dimension list box 577 or the particular dimensions the user has manually entered into the dimension parameter boxes 578 and 579. In this way, regardless of the actual size of the captured image, either without any cropping or framing, or with cropping or framing, the dimensions of that captured image are scaled, either by increasing or decreasing the dimensions of the captured image, so that the entire captured image fits within the dimensions defined in either the fit-in dimension list box 577 or the dimension parameter boxes 578 and 579.

Of course, it should be appreciated that these dimensions, which are defined either by the selected set of dimensions displayed in the fit-in dimension list box 577 or the dimensions displayed in the dimension parameter boxes 578 and 579, specify the maximum scaled size. If the aspect ratio of the captured image and the aspect ratio of the region defined by the selected fit-in dimensions are not equivalent, and the proportional scaling check box 572 has not been checked, then the captured image will be exactly fit to the selected fit-in dimensions, even if this causes the captured image to be distorted. In contrast, if the proportional scaling check box 572 has been checked, then either the width or the height of the scaled captured image will not exactly fit into the selected width or height scaling dimension.

Figure 8:
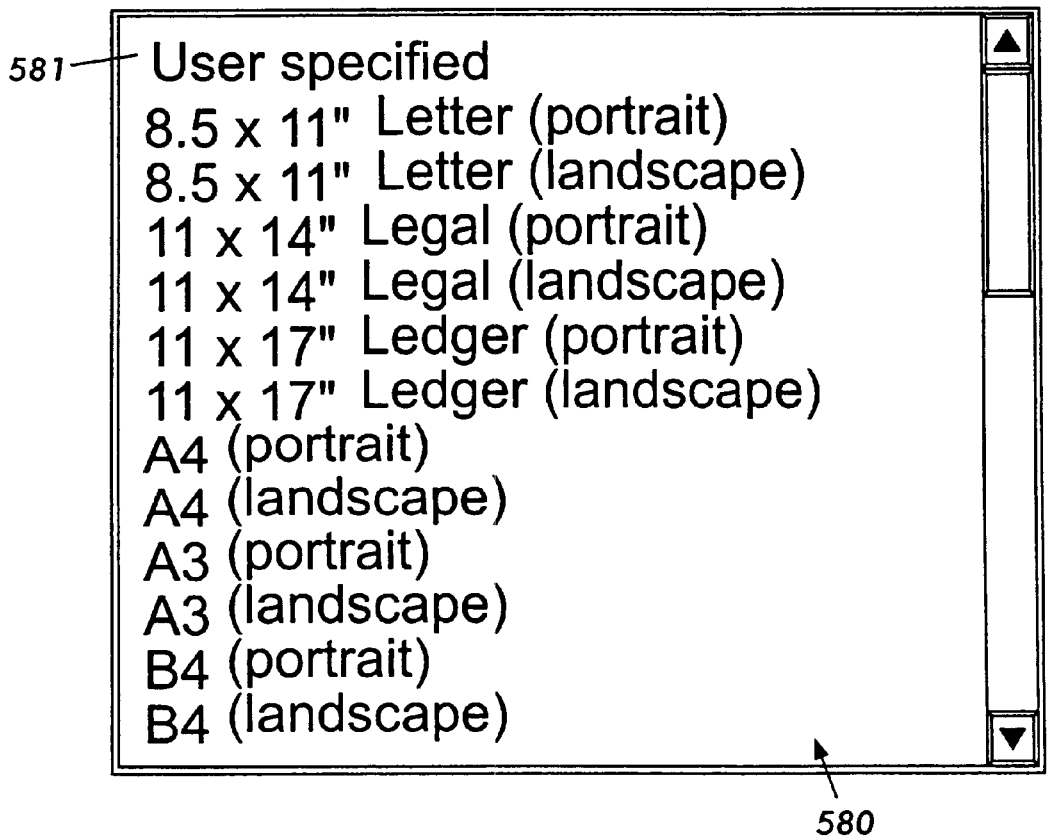
FIG. 8 shows one exemplary embodiment of the list box accessible through the dimension list box portion of the image size tab shown in FIG. 7.

FIG. 8 shows one exemplary embodiment of the list of predetermined sets of fit-in dimensions 580. As shown in FIG. 8, at least one entry in a list 580 of the predetermined sets of dimensions will be a "user-specified" entry 581. In a first exemplary embodiment of the fit-in dimension list box 577, if the fit-in radio button 576 is selected, only the fit-in dimension list box 577 is initially enabled. The user accesses the fit-in dimension list box 577 to display the list 580 of entries containing the various predetermined sets of dimensions. The list 580 also includes the user-specified entry 581. If the user selects any of the entries except the user specified entry 581, the corresponding dimensions of the selected predetermined set of dimensions are displayed in the dimension parameter boxes 578 and 579. However, the dimension boxes 578 and 579 remain disabled.

However, when the user selects the user-specified entry 581, the dimension parameter boxes 578 and 579 are enabled in response to allow the user to enter user-specified scale dimensions into the dimension parameter boxes 578 and 579. In contrast to the second exemplary embodiment of the fit-in dimension list box 577 described below, rather than an actual set of predetermined dimensions being associated with the user-specified entry 581 in this first exemplary embodiment, the user-specified entry 581, when selected and displayed in the fit-in dimension list box 577, becomes an enable control widget that enables the dimension parameter boxes 578 and 579. Thus, once the user-specified entry 581 has been selected and displayed in the fit-in dimension list box 577, the user can enter any permissible value for the width and height dimensions in the dimension parameter boxes 578 and 579.

In a second exemplary embodiment of the fit-in dimension list box 577, each user-specified entry 581 of the list 580 of the predetermined sets of dimensions is set through a "preferences" dialog accessible through the "Options" menu of the graphical user interface 400 shown in FIGS. 6 and 7. In this second exemplary embodiment, the dimension parameter boxes 578 and 579 are enabled with the fit-in dimension list box 577. Accordingly, if one of the predetermined sets of dimensions of the list 580 of the fit-in dimension list box 577 is selected, the corresponding dimensions are automatically entered into the dimension parameter boxes 578 and 579.

It should be appreciated that, if the user then wishes to modify these automatically entered dimensions, the user merely needs to enter a different value into one or both of the dimension parameter boxes 578 and 579. That is, in this second exemplary embodiment of the fit-in dimensions list box 577, the values in the dimension parameter boxes 578 and 579 control the actual dimensions used to scale the captured image when the fit-in radio button 576 is selected. The fit-in dimension list box 577 is thus used only as a short-cut to entering data into the dimension parameter boxes 578 and 579.

Figure 9A:
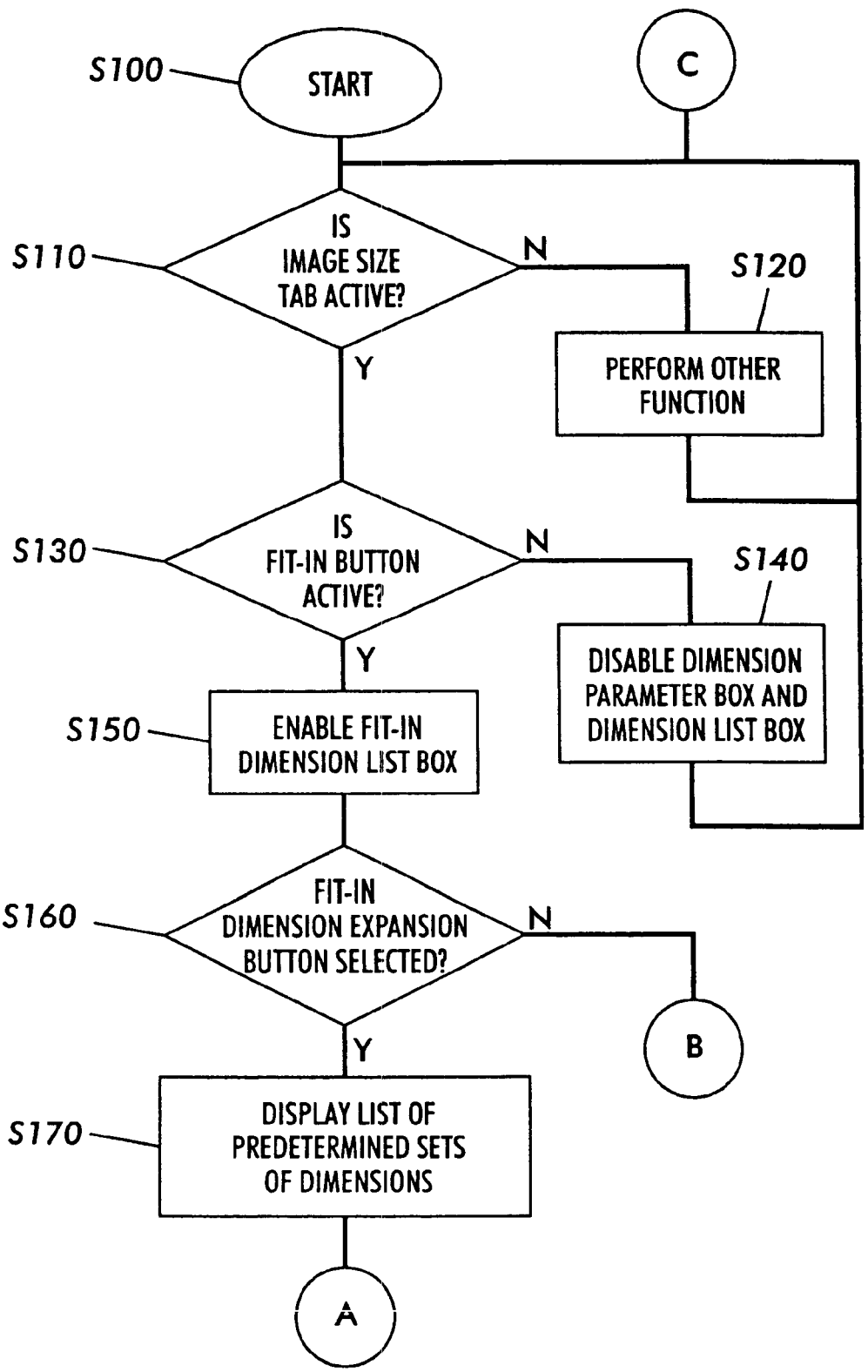
FIGS. 9A–9C are a flowchart outlining a first exemplary embodiment of a method for selecting a set of predetermined scale dimensions and for using the selected set of predetermined scale dimensions according to this invention.
Figure 9B:
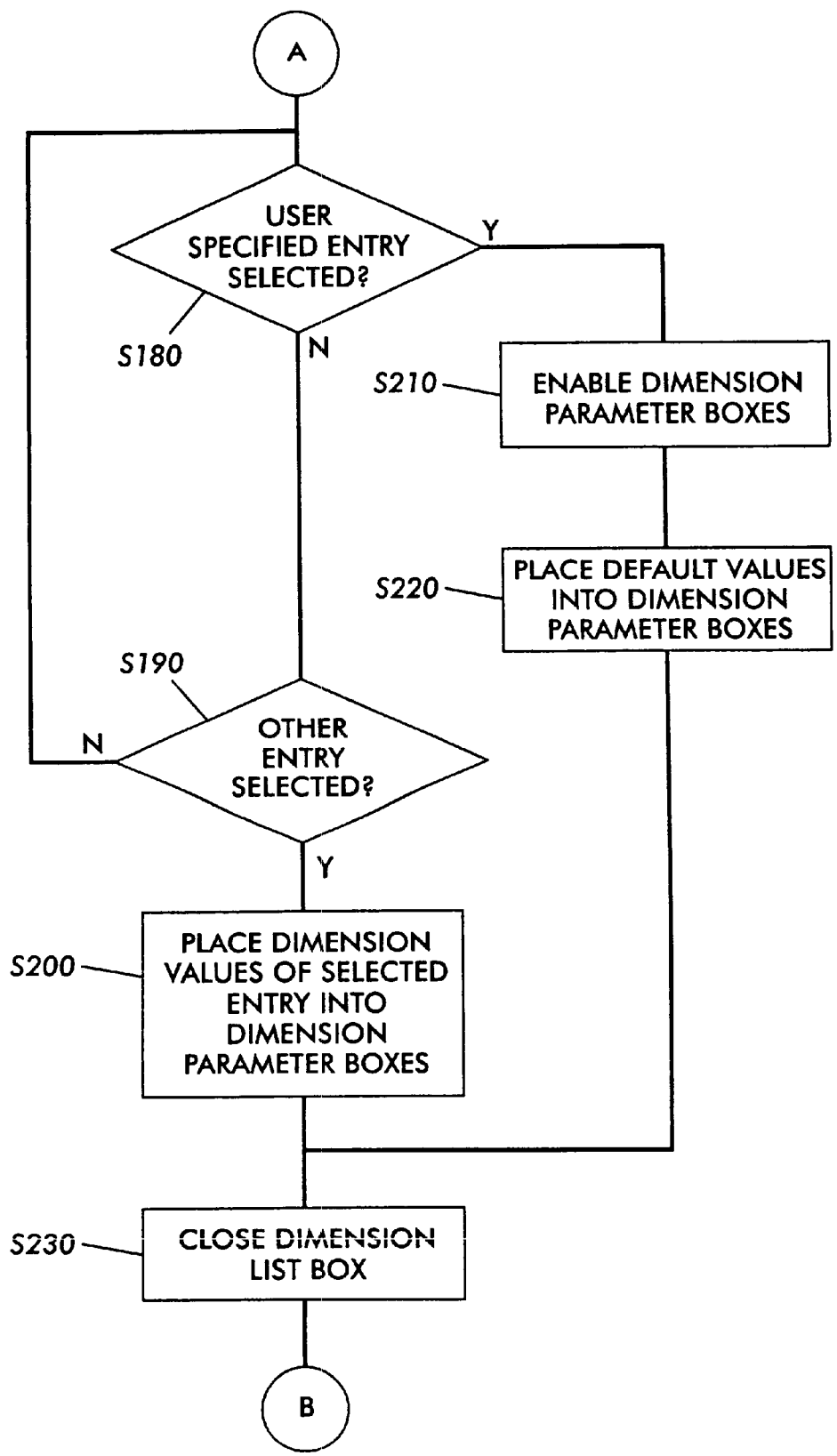
Figure 9C:
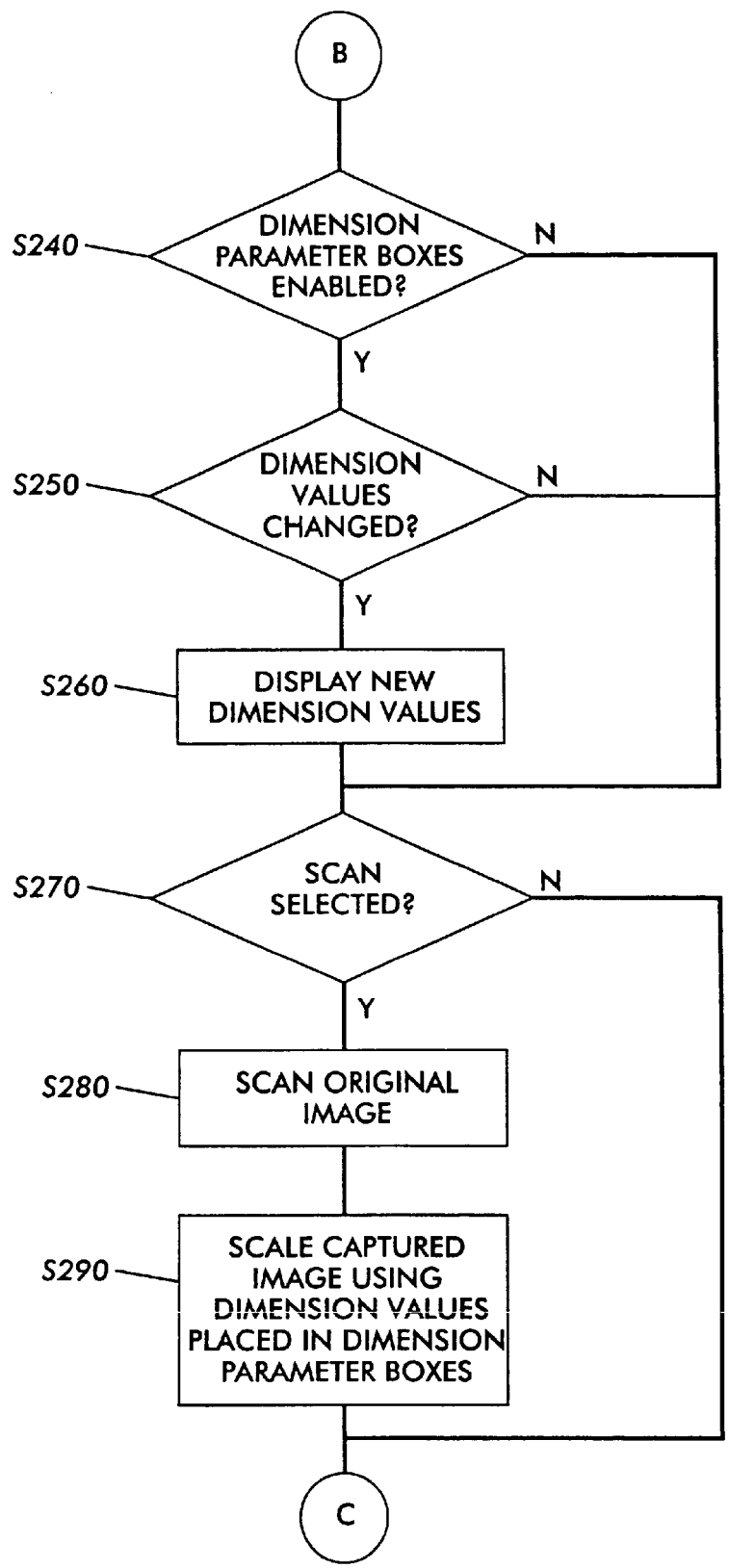

FIGS. 9A–9C are a flowchart outlining a first exemplary embodiment of a method for entering and using fit-to dimension parameters according to this invention. Beginning in step S100, control continues to step S110, where determination is made whether the image size tab is active. If so, control jumps to step S130. Otherwise, control continues to step S120. In step S120, other functions enabled by other portions of the graphical user interface are performed. Control then returns to step S110.

In contrast, in step S130, a determination is made whether the "fit-in" radio button is active. If so, control jumps to step S150. Otherwise, the "scale to" button is active. Control thus continues to step S140, where the dimension list box and the dimension parameter boxes are disabled. Control then returns to step S110.

In step S150, the "fit-in" dimension list box is enabled. Next, in step S160, a determination is made whether the "fit-in" dimension list box expansion button has been selected. If not, control jumps to step S240. Otherwise, control continues to step S170.

In step S170, the list box containing the list of predetermined sets of dimensions is displayed. Next, in step S180, a determination is made whether the user-specified entry of the displayed list box has been selected. If not, control continues to step S190. Otherwise, control jumps to step S210.

In step S190, a determination is made whether any other entry of the displayed list box has been selected. If not, control jumps back to step S180. Otherwise, control continues to step S200, where the dimension values associated with the selected entry of the displayed list box are placed into the dimension parameter boxes. Control then jumps to step S230.

In contrast, in step S210, because the user-specified entry of the displayed list box has been selected, the dimension parameter boxes are enabled. Next, in step S220, a set of default dimension values are placed into the dimension parameter boxes. Control then continues to step S230.

In step S230, the displayed list box is closed and the selected entry is displayed in the "fit-in" dimension list box. Next, in step S240, a determination is made whether the dimension parameter boxes are enabled. If so, control continues to step S250. Otherwise, control jumps to step S270. In step S250, a determination is made whether the user has changed the dimension values displayed in one or both of the dimension parameter boxes. If so, control continues to step S260. Otherwise, control jumps to step S270.

In step S260, the new dimension values are placed into and displayed in the dimension parameter boxes. Next, in step S270, a determination is made whether the scan button of the input size tab has been selected. If so, control continues to step S280. Otherwise, control jumps back to step S110.

In step S280, an image of the original document is captured. Then, in step S290, the captured image is scaled using the dimension values currently placed in the dimension parameter boxes. Control then again jumps back to step S110.

Figure 10A:
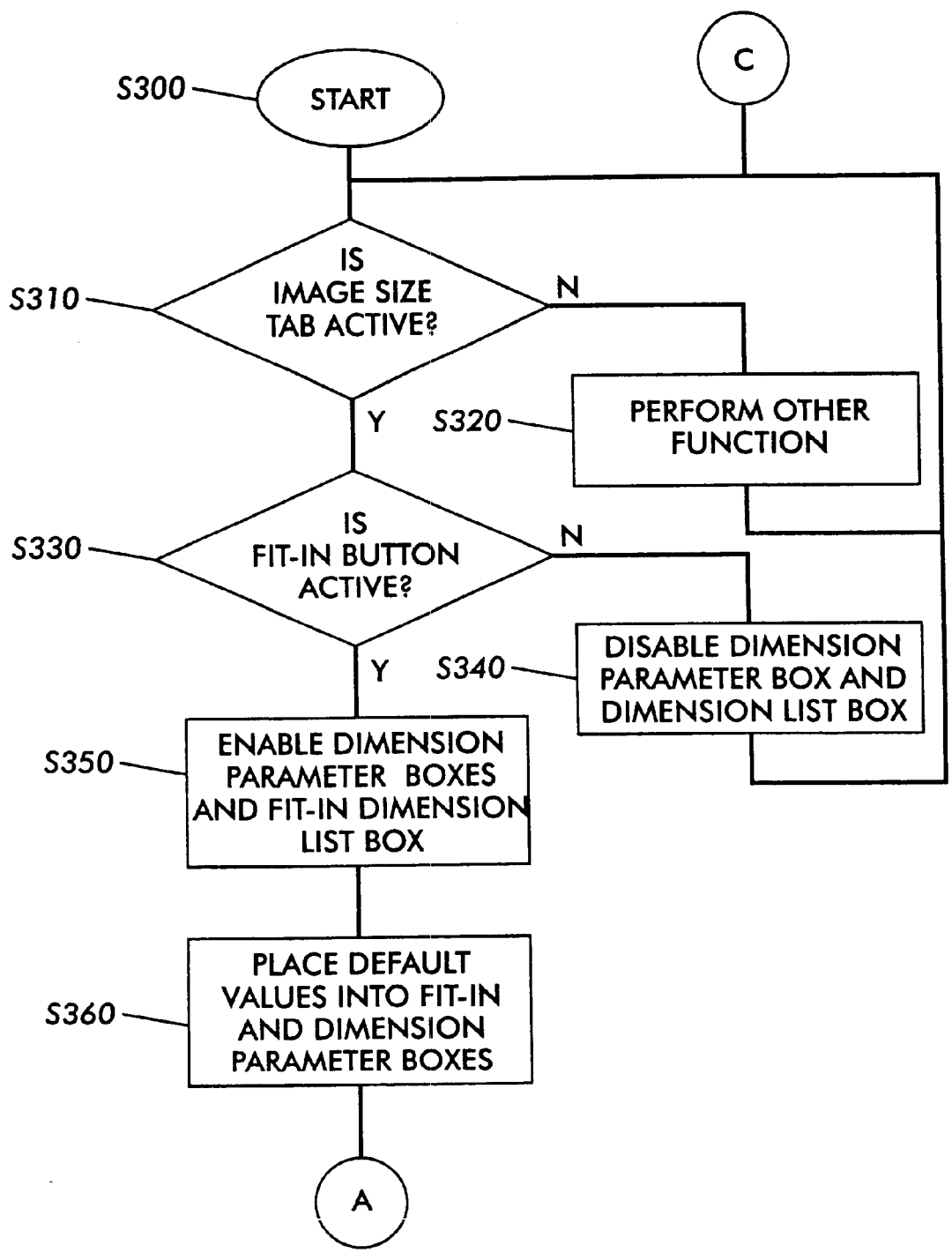
FIGS. 10A–10C are a flowchart outlining a second exemplary embodiment of a method for selecting a set of predetermined scale dimensions and for using the selected set of predetermined scale dimensions according to this invention.
Figure 10B:
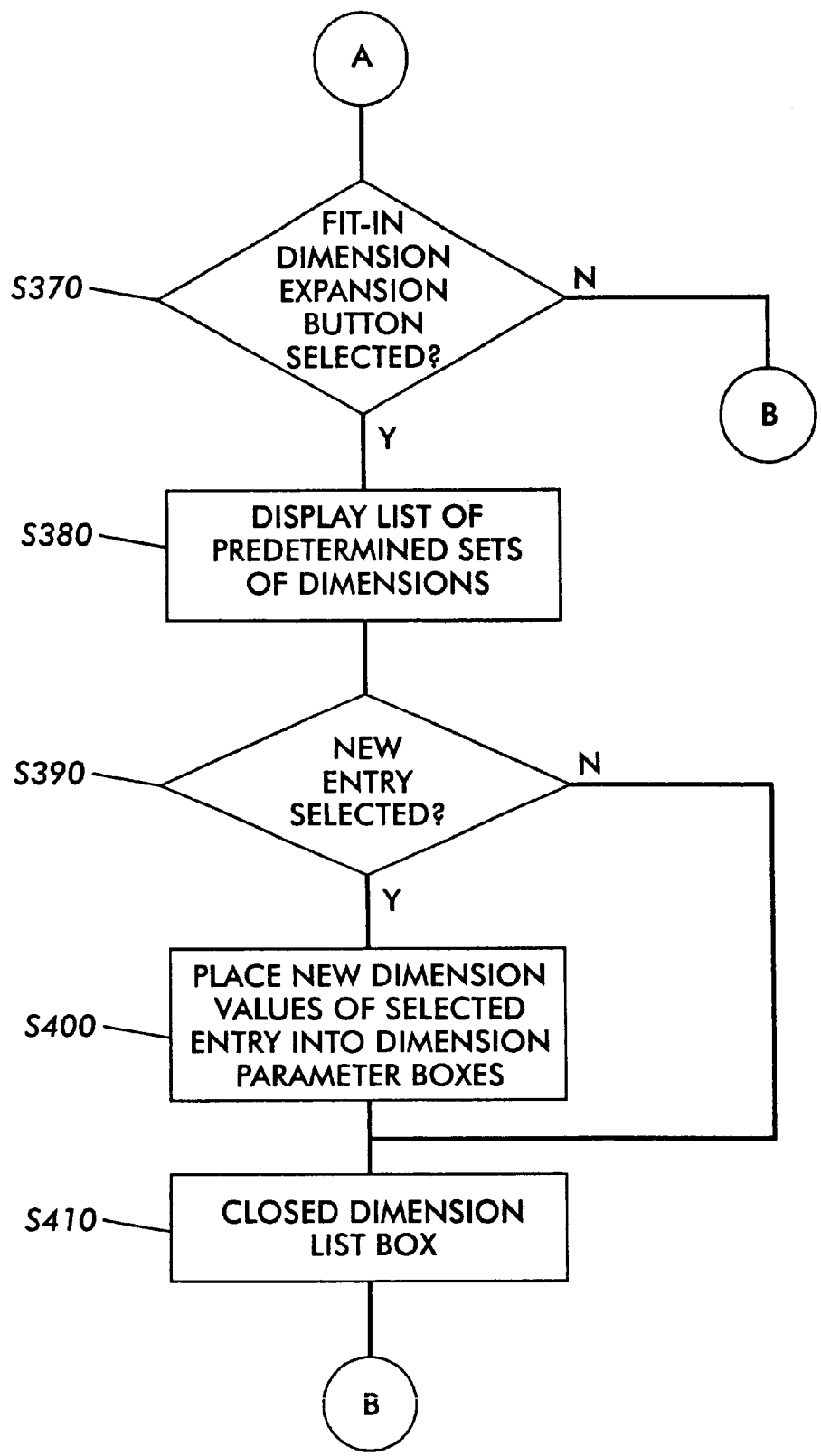
Figure 10C:
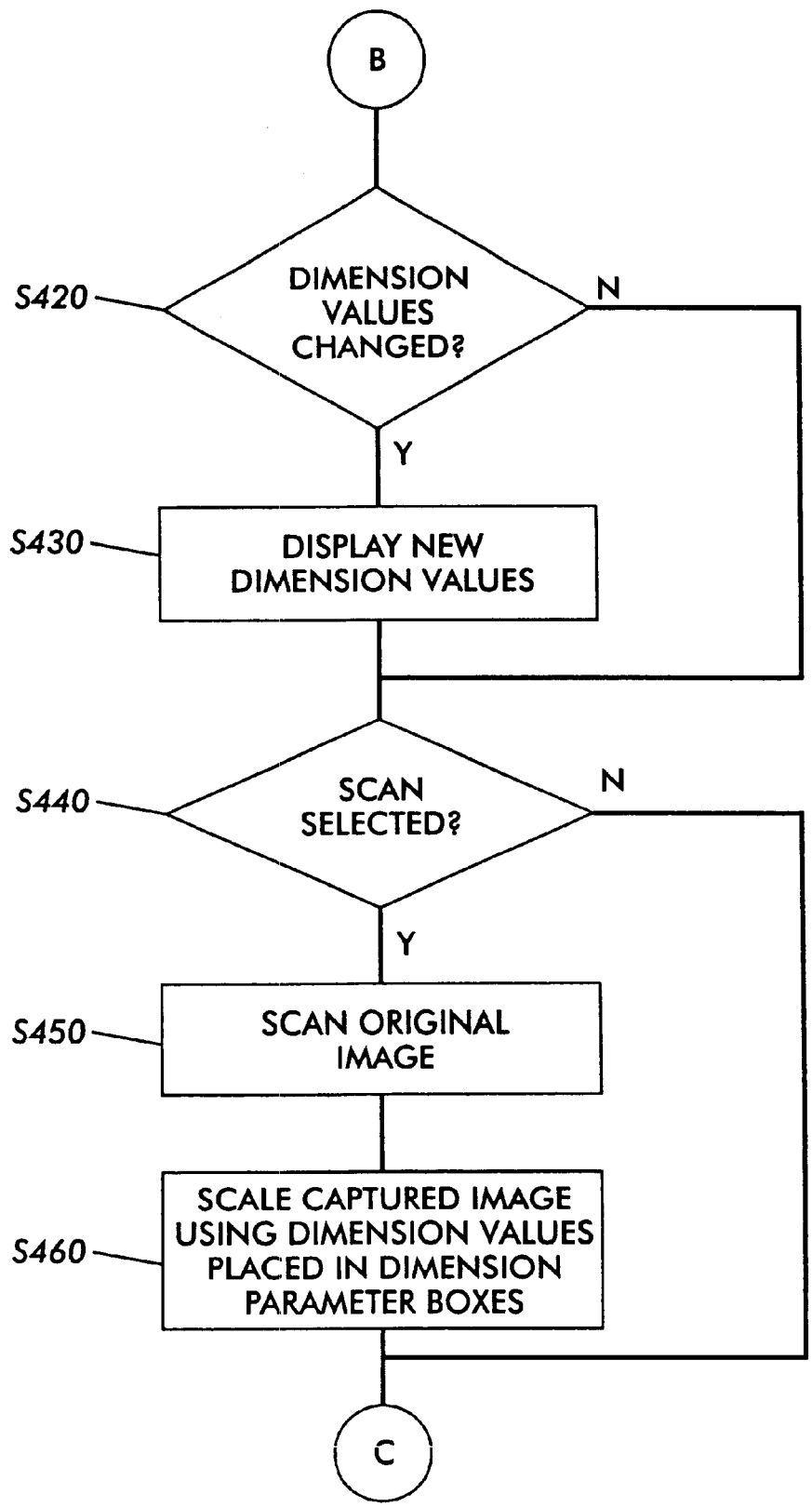

FIGS. 10A–10C are a flowchart outlining a second exemplary embodiment of the methods for selecting and using the scale dimension values according to this invention. Beginning in step S300, control continues to step S310, where determination is made whether the image size tab is active. If so, control jumps to step S330. Otherwise, control continues to step S320. In step S320, other functions enabled by other portions of the graphical user interface are performed. Control then returns to step S310.

In contrast, in step S330, a determination is made whether the "fit-in" radio button is active. If so, control jumps to step S350. Otherwise, the "scale to" button is active. Control thus continues to step S340, where the dimension list box and the dimension parameter boxes are disabled. Control then returns to step S310.

In step S350, the "fit-in" dimension list box and the dimension parameter boxes are enabled. Then, in step S360, a default predetermined set, or a previously selected predetermined set, of dimensions is displayed in the fit-in dimension list box and the dimension parameter boxes. Next, in step S370, a determination is made whether the "fit-in" dimension list box expansion button has been selected. If not, control jumps to step S440. Otherwise, control continues to step S380.

In step S380, the list box containing the list of predetermined sets of dimensions is displayed. Next, in step S390, a determination is made whether an entry of the displayed list box different than the default or previously selected entry has been selected. If so, control continues to step S400. Otherwise, control jumps to step S410. In step S400, the dimension values associated with the newly selected entry of the displayed list box are placed into the dimension parameter boxes. Control then continues to step S410.

In step S410, the displayed list box is closed and the selected entry is displayed in the "fit-in" dimension list box. Next, in step S420, a determination is made whether the user has changed the dimension values displayed in one or both of the dimension parameter boxes. If so, control continues to step S430. Otherwise, control jumps to step S440.

In step S430, the new dimension values are placed into and displayed in the dimension parameter boxes. Next, in step S440, a determination is made whether the scan button of the input size tab has been selected. If so, control continues to step S450. Otherwise, control jumps back to step S310.

In step S450, an image of the original document is captured. Then, in step S460, the captured image is scaled using the dimension values currently placed in the dimension parameter boxes. Control then again jumps back to step S310.

It should be appreciated that the image capture device control systems 200 and 600 shown in FIGS. 2 and 5 can each be implemented on a general purpose computer. However, it should also be appreciated that the image capture device control systems 200 and 600 can also each be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing either of the flowcharts shown in FIGS. 9A–9C or 10A–10C, can be used to implement either of the image capture device control systems 200 or 600.

The memory 630 shown in FIG. 5 can include both volatile and/or non-volatile alterable memory or non-alterable memory. Any alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Thus, it should be understood that each of the elements of the image capture device control systems 200 and 600 shown in FIGS. 2 and 5 can be implemented as portions of a suitably programmed general purpose computer. Alternatively, each of the elements shown in FIGS. 2 or 5 can be implemented as physically distinct hardware circuits within a ASIC, or using a FPGA, a PLD, a PLA, or a PAL, or using discreet logic elements or discreet circuit elements. The particular form each of the elements of the image capture device control systems 200 or 600 shown in FIGS. 2 and 5 will take as a design choice and will be obvious and predictable to those skilled in the art.

Moreover, the image capture device control systems 200 or 600 can each be implemented as software executing on a programmed general purpose computer, a special purpose computer, a microprocessor or the like. In this case, the image capture device control systems 200 and 600 can be implemented as routines embedded in a peripheral driver, as a resource residing on a server, or the like.

The image capture device control systems 200 and 600 can each also be implemented by physically incorporating them into a software and/or hardware system, such as the hardware and software systems of a digital copier or the like.

While this invention has been described in conjunction with the exemplary embodiments outlined above, it is evident that many alternatives and modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An image capture control system for an image capture device, comprising:
    a controller that provides control parameters to the image capture device, the image capture device able to capture an image from an original document based on the provided control parameters, the control parameters including scale parameters usable to scale the image;
    a display device; and
    a graphical user interface displayable on the display device, the graphical user interface including a scale-to parameters input portion, the scale-to parameters input portion including a list box containing at least one selectable set of predefined image size dimensions the image is to be scaled to, the at least one selectable set of predefined image size dimensions including a predefined set of user-specified height scale parameter and width scale parameter, the height scale parameter and the width scale parameter able to be separately selected to produce an aspect ratio for a captured image that is different from an aspect ratio of the image in the original document.

2. The image capture control system of claim 1, wherein:
    the scale parameters usable to scale the image comprise scale factor parameters;
    the graphical user interface further comprises an original image size portion usable to define an original size of the image; and
    the controller further comprises a scale factor determining circuit that determines the scale factor parameters based on the defined original size of the image and a selected one of the at least one selectable set of predefined image size dimensions the image is to be scaled to.

3. The image capture control system of claim 1, wherein:
    the scale parameters usable to scale the image comprise scale factor parameters;
    the graphical user interface further comprises a portion dimensions portion usable to define a portion size of a portion of the image; and
    the controller further comprises a scale factor determining circuit that determines the scale factor parameters based on the defined portion size of the portion of the image and a selected one of the at least one selectable set of predefined image size dimensions the image is to be scaled to.

4. The image capture control system of claim 1, wherein the graphical user interface further includes an input document mimic displaying an orientation of the image from the original document, the orientation adjustable based on the control parameters.

5. A method for scaling an image, the image being captured from an original document, the method comprising:
    providing a set of dimensions defining an image size of at least a portion of the image;
    providing a list of at least one selectable set of predefined image size dimensions the image is to be scaled to, the at least one selectable set of predefined image size dimensions including a predefined set of user-specified height scale parameter and width scale parameter, the height scale parameter and the width scale parameter able to be separately selected to produce an aspect ratio for a captured image that is different from an aspect ratio of the image in the original document;
    selecting one of the list of selectable sets of predefined image size dimensions;
    determining scale factor parameters based on the defined image size and the selected one of the at least one selectable set of predefined image size dimensions the image is to be scaled to; and
    capturing the image based on the determined scale factor parameters.

6. The method of claim 5, wherein the at least one selectable set of predefined image size dimensions the image is to be scaled to comprises at least one set of user-defined image dimensions.

7. A graphical user interface displayable on a display device of an image capture control system for an image capture device, the image capture device able to capture an image from an original document based on control parameters, the control parameters including scale parameters, the graphical user interface comprising:
    a scale-to parameters input portion, the scale-to parameters input portion including a list box containing at least one selectable set of predefined image size dimensions the image is to be scaled to, the at least one selectable set of predefined image size dimensions including a predefined set of user-specified height scale parameter and width scale parameter, the height scale parameter and the width scale parameter able to be separately selected to produce an aspect ratio for a captured image that is different from an aspect ratio of the image in the original document.

8. The graphical user interface of claim 7, further comprising:
    an original image size portion usable to define an original size of the image; and
    a scale factor parameters display portion that displays scale factor values, the scale factors automatically determined based on the defined original size defined in the original image size portion and a selected one of the at least one selectable set of predefined image size dimensions selected from the list of at least one selectable set of predefined image size dimensions.

9. The graphical user interface of claim 7, further comprising:
   a portion dimensions portion usable to define a portion size of a portion of the image; and
   a scale factor parameters display portion that displays scale factor values, the scale factors automatically determined based on the defined portion size defined in the portion dimensions portion and a selected one of the at least one selectable set of predefined image size dimensions selected from the list of at least one selectable set of predefined image size dimensions.

* * * * *